(12) United States Patent
Soukup et al.

(10) Patent No.: US 8,396,930 B2
(45) Date of Patent: Mar. 12, 2013

(54) SYSTEMS AND METHODS FOR FACILITATING CREATING CALENDAR ENTRIES IN CLIENT DEVICES

(75) Inventors: Tomas Soukup, Plzen (CZ); Stepan Potys, Havirov (CZ); Otakar Leopold, Klatovy (CZ)

(73) Assignee: Kerlo Technologies Inc., San Jose, CA (US)

( * ) Notice: Subject to any disclaimer, the term of this patent is extended or adjusted under 35 U.S.C. 154(b) by 438 days.

(21) Appl. No.: 12/275,113

(22) Filed: Nov. 20, 2008

(65) Prior Publication Data

US 2010/0125638 A1    May 20, 2010

(51) Int. Cl.
G06F 15/16    (2006.01)
(52) U.S. Cl. .................................................... 709/206
(58) Field of Classification Search .................. 709/206
See application file for complete search history.

(56) References Cited

U.S. PATENT DOCUMENTS

| | | | |
|---|---|---|---|
| 2002/0116505 A1* | 8/2002 | Higgins et al. ............... | 709/227 |
| 2004/0006551 A1* | 1/2004 | Sahinoja et al. ............... | 707/1 |
| 2004/0148358 A1* | 7/2004 | Singh et al. .................. | 709/207 |
| 2007/0288658 A1* | 12/2007 | Lam et al. ..................... | 709/246 |
| 2008/0102889 A1* | 5/2008 | May et al. .................. | 455/556.2 |
| 2008/0147692 A1* | 6/2008 | Hovey et al. .................. | 707/101 |
| 2008/0263071 A1* | 10/2008 | Ferlitsch et al. ............... | 707/101 |
| 2009/0182821 A1* | 7/2009 | Allen et al. ................... | 709/206 |

* cited by examiner

*Primary Examiner* — Jeong S Park
(74) *Attorney, Agent, or Firm* — IPSG, P.C. Intellectual Property Law (57) ABSTRACT

A method for facilitating creating one or more calendar entries in one or more client devices. The method may include includes receiving an iTIP message from a first client device associated with a first user and having a first calendar application. The iTIP message may be addressed to at least a second user, wherein the second user may be associated with a second client device having a second calendar application. The method may also include generating an iMIP message using the iTIP message. The method may also include providing at least one of a copy of the iTIP message and a copy of the iMIP message to a least one of the second client device and a second communication server device connected to the second client device for enabling the second calendar application to generate a calendar entry in the second client device.

17 Claims, 6 Drawing Sheets

SYSTEMS AND METHODS FOR FACILITATING CREATING CALENDAR ENTRIES IN CLIENT DEVICES

BACKGROUND OF THE INVENTION

The present invention relates to systems and methods for creating calendar entries in client devices. More particularly, the present invention relates to systems and methods for facilitating the creation of at least a calendar entry in at least one recipient's client device according to a calendar message sent from the message originator's client device.

Presently, there are various calendar applications suitable for various operating systems utilized by various client devices. For example, there are the Outlook® calendar application for the Windows® operating system, the Entourage® calendar application for the Mac OS® operating system, the iCal® calendar application for the Mac OS® operating system, etc. Windows®, Outlook®, and Entourage® are available from Microsoft Corporation, www.microsoft.com. Mac OS® and iCal® are available from Apple Inc., www.apple.com.

Different calendar applications may be compatible with different protocols, such as different communication protocols and different calendar message protocols, for transporting calendar messages. For example, Outlook® is compatible with IMAP (Internet Message Access Protocol) and iMIP (iCalendar Message-Based Interoperability Protocol), Entourage® is compatible with the WebDAV (Web-based Distributed Authoring and Versioning) protocol and iMIP, and iCal® is compatible with the CalDAV (Calendaring Extensions to WebDAV) protocol and iTIP (iCalendar Transport-Independent Interoperability Protocol). Differences in protocols may result in incompatibility between calendar applications and calendar messages (or interoperability problems between calendar applications).

In general, a user of a client device may create and access calendar entries in the client device utilizing the calendar application implemented on the client device. The user may also send a calendar message to another user, i.e., a recipient of the calendar message, for a calendar entry to be created in the recipient's client device. For example, the calendar message may include a notice concerning an event, such as a meeting, an appointment request, or a party invitation. If the calendar message, when received by the recipient's client device, is in a format compatible with the calendar application implemented on the recipient's client device, the event notice may be correctly displayed by the recipient's calendar application, and a calendar entry (which specifies one or more of the time, the location, the attendees, etc. pertaining to the event) may be correctly created in the recipient's client device by the recipient's calendar application. However, if the recipient's calendar application is incompatible with the calendar message, the recipient's calendar application may not be able to correctly create a calendar entry according to the calendar message.

Prior art techniques may be unable to effectively resolve the incompatibility or interoperability problems. One of the reasons is that prior art techniques may utilize complicated identifiers for identifying calendar message originators and recipients. As an example, the originator identifier in a prior art calendar message may be a complicated directory path or address, for example, in the format of "http://servername/principals/users/bill". The information contained in the prior art originator identifier may not be efficiently and effectively resolved by the recipient's calendar application and/or the communication server device associated with the recipient's client device. As a result, the recipient's calendar application may not be able to effectively create a calendar entry based on the calendar message.

In addition, prior art techniques may not provide desirable reliability and efficiency in generating and/or transporting calendar messages. For example, accordingly to prior art arrangements, identifiers for calendar message originators and recipients may need to be retrieved from a LDAP (Lightweight Directory Access Protocol) server that is external to the communication server device responsible for transporting calendar messages. When the LDAP server is busy or not responding, the identifiers may be unavailable. Consequently, calendar messages may not be timely generated, and/or the delivery of calendar messages may be delayed.

SUMMARY

An embodiment of the invention relates to a method for facilitating creating one or more calendar entries in one or more client devices. The method may include includes receiving, using a first communication server device, an iTIP (iCalendar Transport-Independent Interoperability Protocol) message from a first client device, wherein in the first client device may be associated with a first user, the first client device may have a first calendar application, the iTIP message may be addressed to at least a second user, and the second user may be associated with a second client device that has a second calendar application. The method may also include generating, using the first communication server device, an iMIP (iCalendar Message-Based Interoperability Protocol) message using the iTIP message. The method may also include providing at least one of a copy of the iTIP message and a copy of the iMIP message to a least one of the second client device and a second communication server device connected to the second client device for enabling the second calendar application to generate a calendar entry in the second client device.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover an article of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable circuits adapted for the various operations pertaining to embodiments of the invention.

One or more embodiments of the present invention relate to a communication server device for facilitating creating one or more calendar entries in one or more client devices, wherein a client device may represent an electronic device, such as a computer, personal digital assistant, or a mobile phone, that operates a calendar client application. The communication server device is responsible for at least transporting calendar messages between client devices. One or more embodiments of the invention relate to methods, for example, implemented using the communication server device, for facilitating creating one or more calendar entries in one or more client devices.

The communication server device may generate user identifiers utilizing email addresses of users. For example, each user identifier may simply include an attached phrase, such as "mailto:" preceding an email address. In general, the user identifiers with email addresses may be readily resolvable to various calendar applications compatible with various protocols without requiring extensive parsing of the user identifiers. Accordingly, embodiments of the invention may advantageously resolve the problems of incompatibility between calendar applications and calendar messages. Advantageously, embodiments of the invention may provide satisfactory efficiency in processing calendar messages.

Embodiments of the invention may also convert (or manipulate) calendar messages to facilitate creating calendar entries. For example, the communication server device may receive an iTIP (iCalendar Transport-Independent Interoperability Protocol) message from a first client device, wherein the first client device may be associated with a first user and may operate a first calendar application, the iTIP message may be addressed to at least a second user, and the second user may be associated with a second client device operating a second calendar application. After receiving the iTIP message, the communication server device may generate an iMIP (iCalendar Message-Based Interoperability Protocol) message using the iTIP message, such that the iMIP message may contain calendar event information included in the iTIP message for facilitating delivery of the calendar event information.

The communication server device may also use information stored in a storage unit of the communication server device to determine one or more characteristics associated with the second user, the second client device, and/or the second calendar application. By minimizing dependence on an external LDAP (Lightweight Directory Access Protocol) server in obtaining necessary information, embodiments of the invention may advantageously enable efficient and effective generation and delivery of calendar messages.

If the communication server device determines that the second client device is connected to the communication server device through another communication server device (or a "second communication server device"), the communication server device may wrap a copy of the iMIP message in a SMTP (Simple Mail Transfer Protocol) message and then provide the SMTP message to the second communication server device utilizing well-known email transportation methods and/or mechanisms. If the second calendar application is compatible with iMIP messages, the second communication server device may provide the copy of the iMIP message to the second client device. If the second calendar application is compatible with iTIP messages, the second communication server device may obtain a copy of the iTIP message from the iMIP message, and then provide the copy of the iTIP message to the second client device. Accordingly, the second calendar application may correctly create a calendar entry in the second client device.

If the second client device is connected to the communication server device without being connected through another communication server device, and if the communication server device determines that the second calendar application is compatible with iTIP, e.g., the second calendar application is compatible with the CalDAV (Calendaring Extensions to WebDAV) protocol, the communication server device may remove at least an email envelope or an email envelope component from a copy of the iMIP message to obtain a copy of the iTIP message and then provide the copy of the iTIP message to the second client device for enabling the second calendar application to effectively create a calendar entry based on content of the copy of the iTIP message.

If the second client device is connected to the communication server device without being connected through another communication server device, and if the communication server device determines that the second calendar application is compatible with iMIP, e.g., the second calendar application is compatible with the WebDAV (Web-based Distributed Authoring and Versioning) protocol and/or IMAP (Internet Message Access Protocol), the communication server device may provide a copy of the iMIP message to the second client device for enabling the second calendar application to effectively create a calendar entry based on content of the copy of the iMIP message, which may include content of a copy of the iTIP message.

In one or more embodiments, a user can connect simultaneously to multiple devices (e.g., one employing iMIP and one employing iTIP) and still be able to see calendar events in his inbox or in his calendar in their proper states on each of the devices.

As can be appreciated from the above example, embodiments of the invention may provide iMIP messages to client devices with iMIP-compatible calendar applications and may provide iTIP messages to client devices with iTIP-compatible calendar applications. Advantageously, various calendar applications may be ensured to receive compatible calendar messages to effectively create calendar entries.

The features and advantages of the present invention may be better understood with reference to the figures and discussions that follow.

Figure 1:
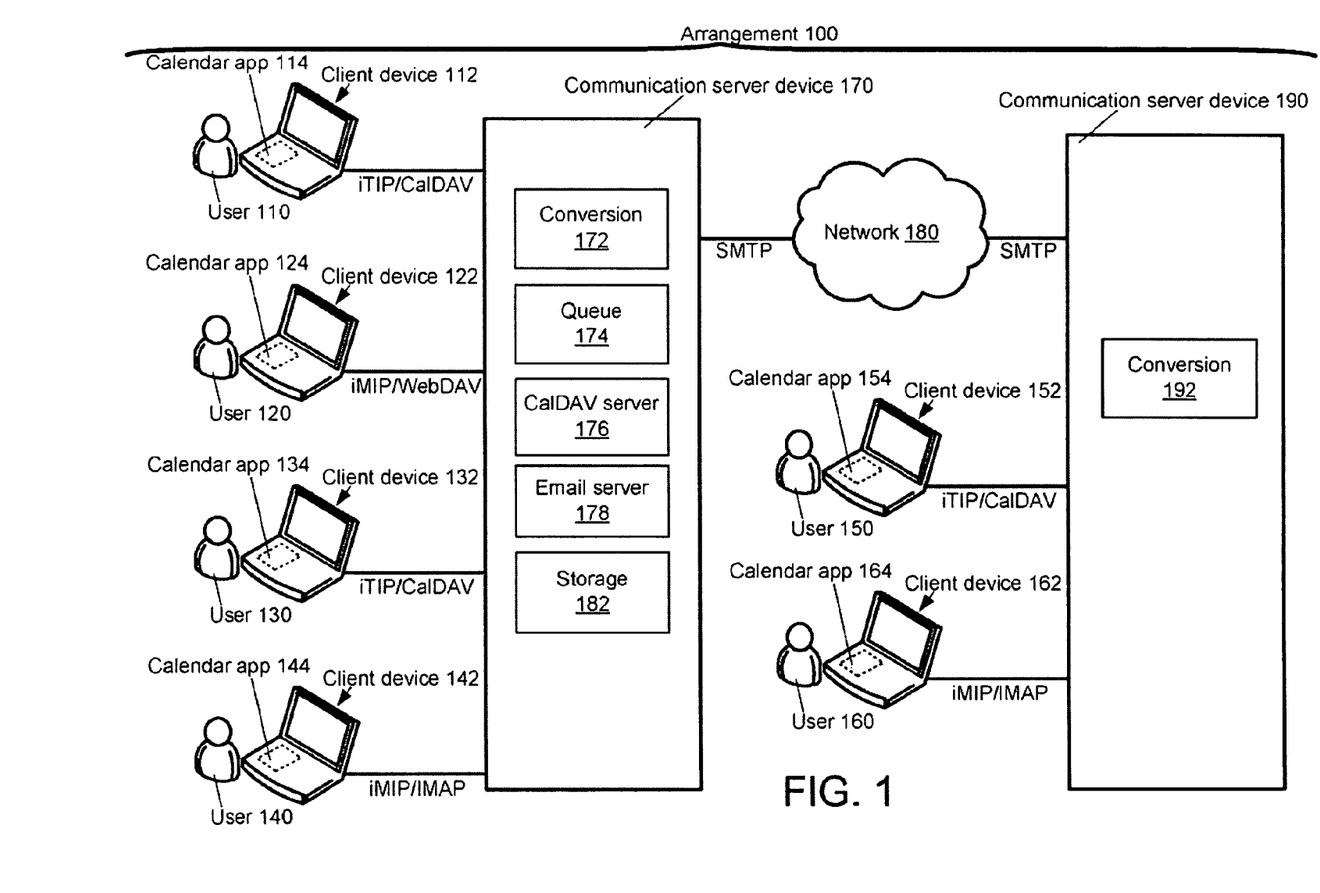
FIG. 1 shows a schematic diagram illustrating an arrangement including at least a communication server device for facilitating creating one or more calendar entries in one or more client devices in accordance with one or more embodiments of the present invention.

FIG. 1 shows a schematic diagram illustrating an arrangement 100 including at least a communication server device 170 (or "server 170") for facilitating creating one or more calendar entries in one or more client devices in accordance with one or more embodiments of the present invention. For example, the one or more client devices may include one or more of client devices connected to server 170, such as client device 112 (or "client 112"), client device 122 (or "client 122"), client device 132 (or "client 132"), client device 142 (or "client 142"), client device 152 (or "client 132"), and client device 162 (or "client 142"), wherein client 152 and client 162 may be connected to server 170 through another communication server device 190 (or "server 190") and network 180 (which may include the Internet and/or one or more intranets). Client 112, client 122, client 132, client 142, client 152, and client 162 may be associated with a user 110, a user 120, a user 130, a user 140, a user 150, and a user 160, respectively, and may operate a calendar application 114, a calendar application 124, a calendar application 134, a calendar application 144, a calendar application 154, and a calendar application 164, respectively.

Server 170 may include a conversion unit 172, a queue 174, a CalDAV server application 176 (or "CalDAV server 176"), an email server application 178 (or "email server 178"), and a storage unit 182. In one or more embodiments, server 190 also may include a conversion unit 192. The features and advantages of server 170, server 190, and related methods and components are further discussed with reference to the examples of FIGS. 2-5.

Figure 2:
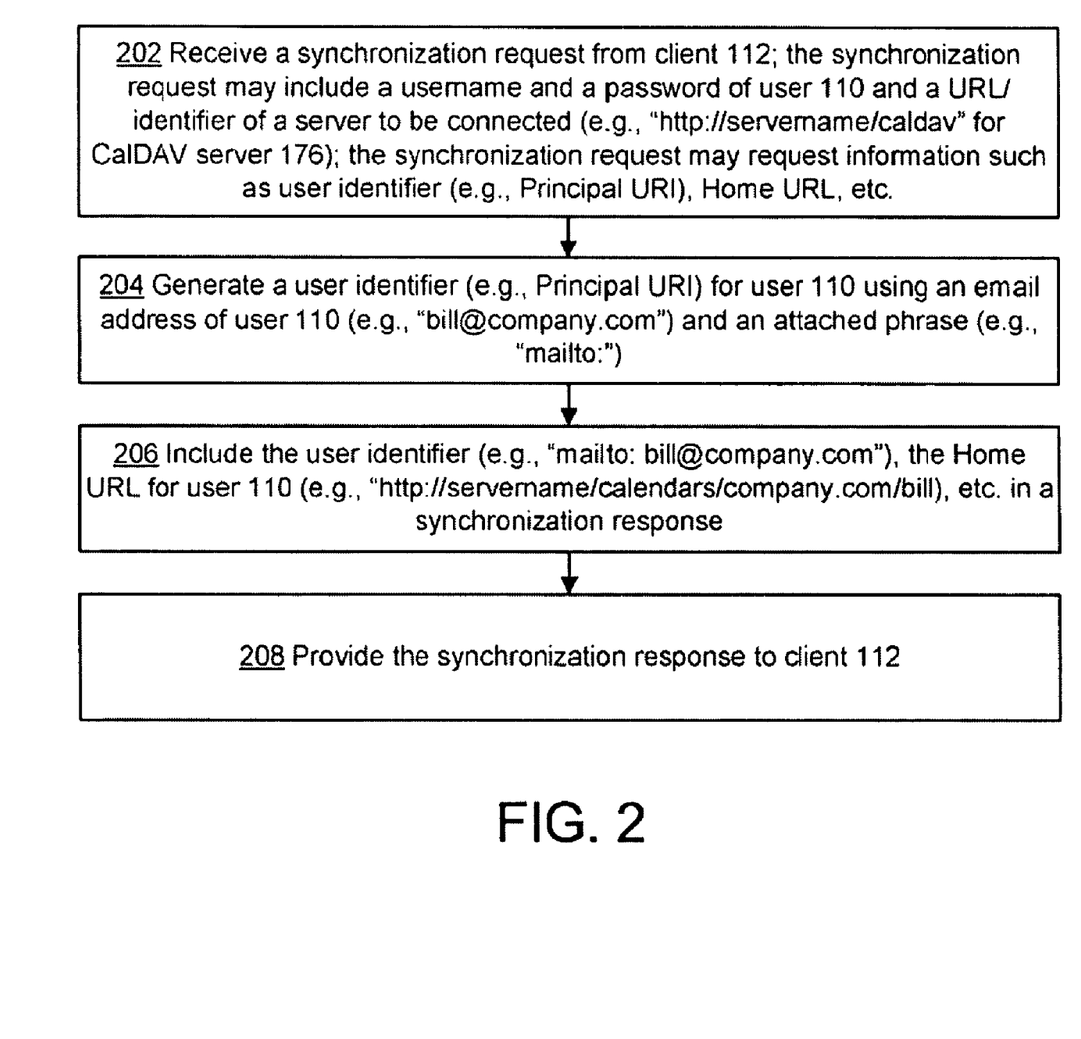
FIG. 2 shows a flowchart illustrating a method for synchronizing at least a client device with a communication server device for facilitating creating one or more calendar entries in one or more client devices in accordance with one or more embodiments of the present invention.

FIG. 2 shows a flowchart illustrating a method for synchronizing at least a client device (such as one of the client devices illustrated in the example of FIG. 1) with a communication server device for facilitating creating one or more calendar entries in one or more client devices in accordance with one or more embodiments of the present invention. For facilitating discussion, client 112 and server 170 illustrated in the example of FIG. 1 may serve as illustrative examples for the client device and the communication server, respectively.

The method may start with step 202, in which server 170 may receive a synchronization request from client 112. The synchronization request may include a username and a password of user 110. The synchronization request may also include an identifier (e.g., a URL, or Uniform Resource Locator) of a server application that calendar application 114 connects to or will connect to. As an example, the synchronization request may include the URL "http://servername/caldav" that identifies CalDAV server 176 (illustrated in the example of FIG. 1) in server 170. The URL may be automatically provided by a related LDAP server.

Given that calendar application 114 is to connect to CalDAV server 176, server 170 may determine that calendar application 114 is compatible with the CalDAV protocol. In one or more embodiments, server 170 may store the protocol compatibility information pertaining to calendar application 114, client 112, and/or user 110 in storage unit 182 (illustrated in the example of FIG. 1) in server 170. In one or more embodiments, when a client device registers and/or synchronize with server 170, server 170 may identify the calendar protocol that is compatible with the calendar application associated with the registering and/or synchronizing client device. Accordingly, server may generate associated calendar protocol information and store the calendar protocol information in storage unit 182. As a result, server 170 may readily have access to calendar protocol information pertaining to various client devices connected with server 170.

The synchronization request may also include a requested property list for requesting information such as a user identifier (e.g., in the form of a Principal URI, or Principal Uniform Resource Identifier) for user 110, a calendar identifier (e.g. in the form of a Home URL), etc.

In step 204, server 170 may generate a user identifier for user 110 using an email address of user 110 (e.g., "bill@company.com") and an attached phrase (e.g., "mailto:"). In one or more embodiments, the attached phrase may precede the email address. For example, the user identifier for user 110 may have the format of, for example, "mailto:bill@company.com". Server 170 may also obtain and/or generate the requested calendar identifier for user 110 (e.g., in the format of "http://servername/calendars/company.com/bill").

In step 206, server 170 may include requested information, such as the user identifier for user 110, the calendar identifier for user 110, etc. in a synchronization response.

In step 208, server 170 may provide the synchronization response to client 112. Subsequently, calendar application 114 may utilize at least the user identifier (e.g., "mailto:bill@company.com") in generating calendar messages. An example of calendar messages in accordance with one or more embodiments of the invention is discussed with reference to the example of FIG. 3A.

In general, the email-address-based user identifiers may be readily recognizable and/or resolvable to various calendar applications compatible with various protocols without requiring much parsing of the user identifiers. Advantageously, embodiments of the invention may effectively resolve the problems of incompatibility between calendar applications and calendar messages. Advantageously, embodiments of the invention may provide satisfactory efficiency in processing calendar messages.

Figure 3A:
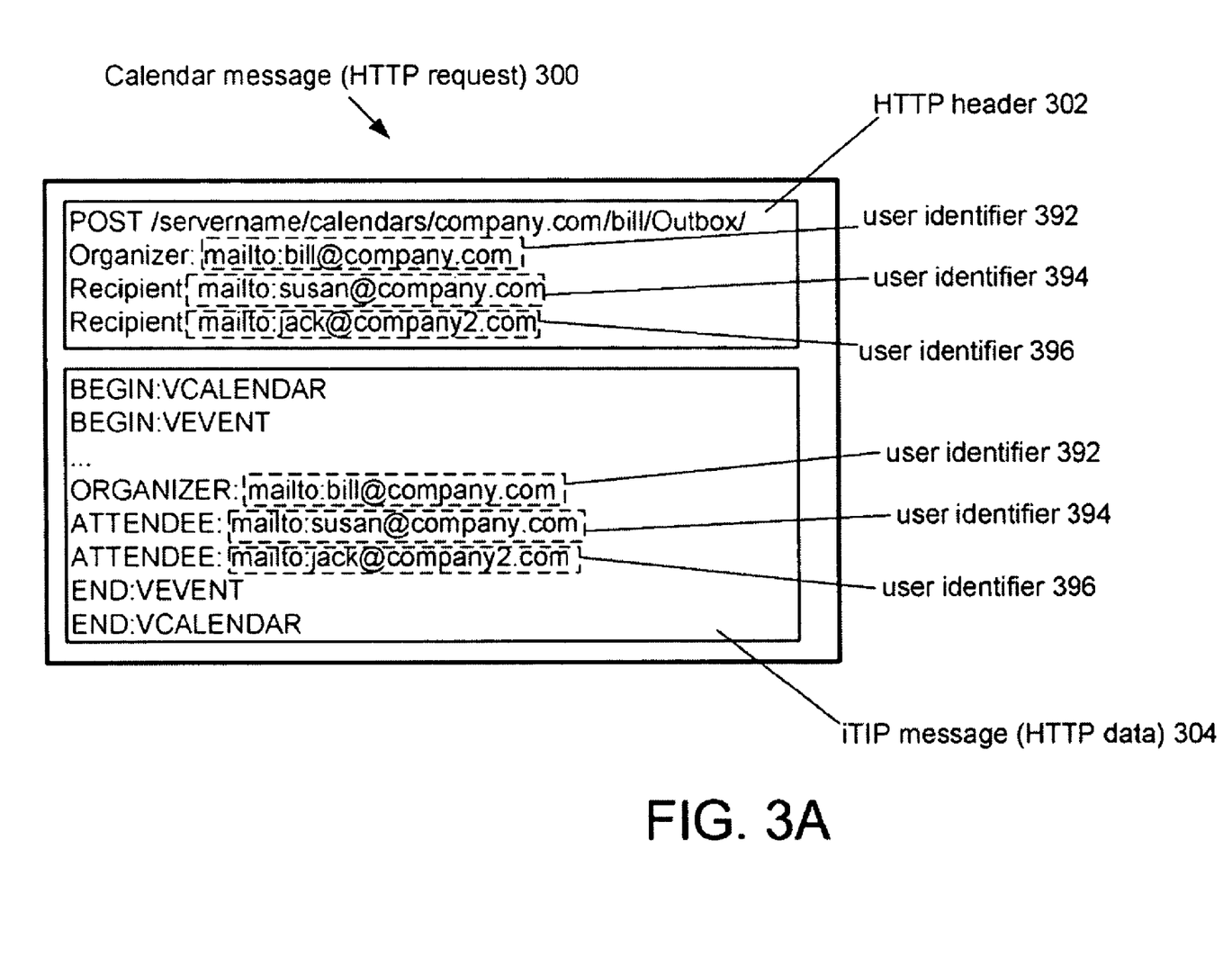
FIG. 3A shows a schematic diagram illustrating an example calendar message generated by a calendar application compatible with the CalDAV (Calendaring Extensions to WebDAV) protocol in accordance with one or more embodiments of the present invention.

FIG. 3A shows a schematic diagram illustrating an example calendar message 300 (or HTTP request 300) generated by a calendar application (e.g., calendar application 114 illustrated in the example of FIG. 1) compatible with the CalDAV protocol in accordance with one or more embodiments of the present invention. Calendar message 300 may be addressed to recipients (i.e., invited attendees for a particular event) for calendar applications associated with the recipients to create calendar entries accordingly. Calendar message 300 may include a HTTP header 302 and an iTIP message 304 (or HTTP data 304). Each of HTTP header 302 and iTIP message 304 may include user identifiers such that each of the user identifiers is formed of an attached phrase and a user email. For example, HTTP header 302 may include user identifier 392 "mailto:bill@company.com", user identifier 394 "mailto:susan@company.com", and user identifier 396

"mailto:jack@company2.com" for identifying the organizer (e.g., user 110) and the recipients; iTIP message 304 may include user identifier 392, user identifier 394, and user identifier 396 for specifying the organizer and the invited attendees for the event.

As discussed earlier, the simple, email-address-based user identifier format may advantageously facilitate calendar application interoperability and may advantageously improve message processing efficiency.

Figure 3B:
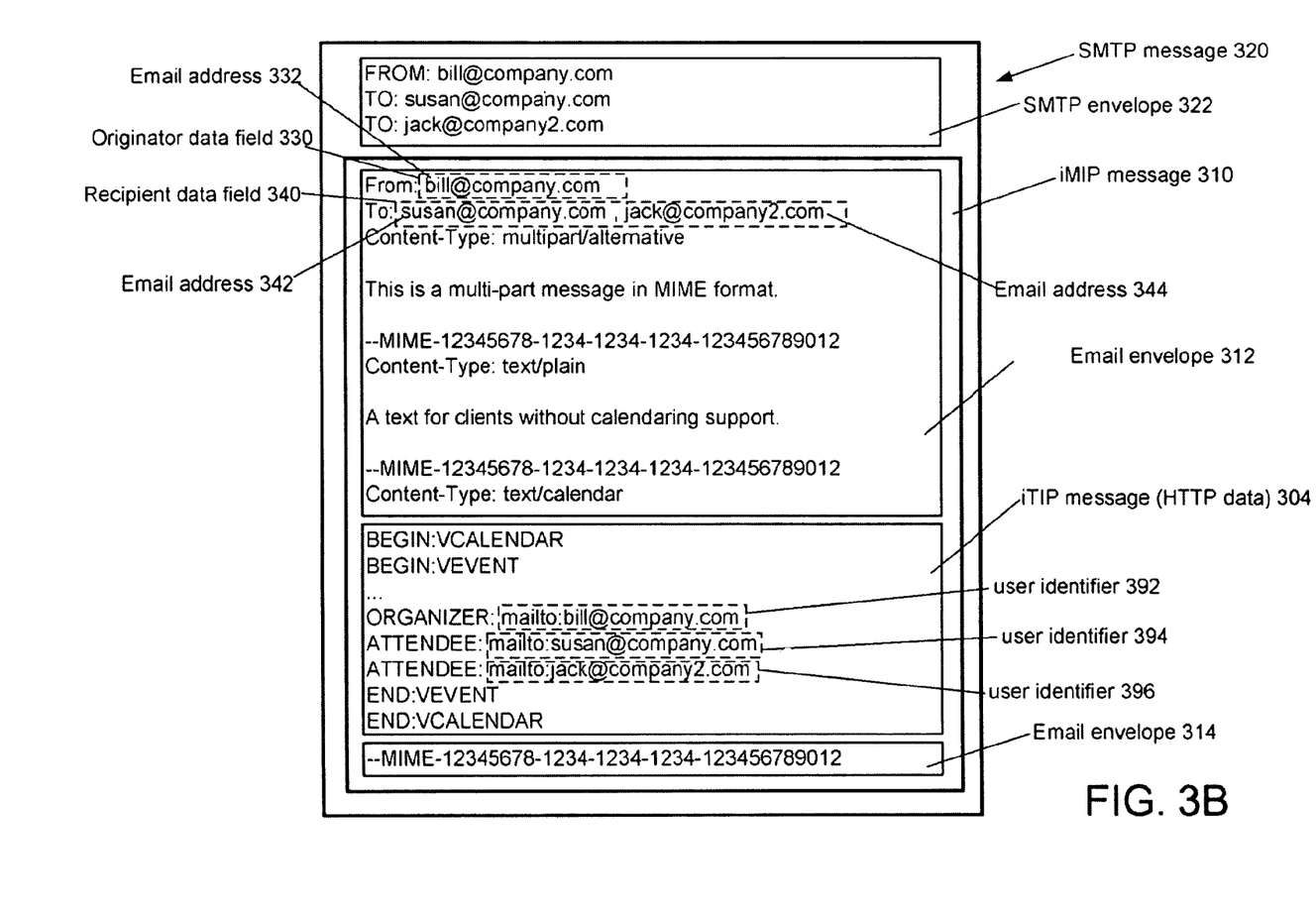
FIG. 3B shows a schematic diagram illustrating an example SMTP (Simple Mail Transfer Protocol) calendar message including an iMIP (iCalendar Message-Based Interoperability Protocol) message in accordance with one or more embodiments of the present invention.

FIG. 3B shows a schematic diagram illustrating an example SMTP (Simple Mail Transfer Protocol) calendar message 320 including an iMIP (iCalendar Message-Based Interoperability Protocol) message 310 and a SMTP envelope 322 in accordance with one or more embodiments of the present invention.

SMTP calendar message 320 may be generated by a communication server device, such as server 170 illustrated in the example of FIG. 1, in accordance with one or more embodiments of the invention. SMTP calendar message 320 (or a copy thereof) may be transmitted to another communication server device, such as server 190 illustrated in the example of FIG. 1, for providing iMIP message 310 and/or iTIP message 304 included therein to one or more client devices connected to server 190, as further discussed with reference to the example of FIGS. 4-5. Server 170 may also be responsible for generating iMIP message 310 (and copies thereof) for enabling iMIP-compatible calendar applications to create calendar entries, while iTIP message 304 (and/or copies thereof) may be provided to iTIP-compatible calendar applications for effectively creating calendar entries, also as further discussed with reference to the example of FIGS. 4-5.

Server 170 may generate iMIP message 310 by adding one or more email envelopes or email envelope components, such as email envelope 312 and email envelope 314, to iTIP message 304, which may be provided by calendar application 114 as discussed in the example of 3A. Email envelope 314 may include the originator's email address 332 as the data value for an originator data field 330. Email envelope 314 may also include recipient's email address 342 and recipient's email address 344 as the data value for a recipient data field 340. Server 170 may obtain the email addresses by simply removing the attached phrase (e.g., "mailto:") from each of user identifier 392, user identifier 394, and user identifier 396 in iTIP message 304, without performing sophisticated or complicated parsing. Advantageously, SMTP calendar message 320 may be efficiently generated.

Server 170 may generate SMTP calendar message 320 by wrapping iMIP message 310 in an SMTP envelope 322. SMTP envelope 322 may include the email address of the sender (e.g., user 110) and the email addresses of the recipients. Similarly to the processes discussed above, the email addresses may be efficiently obtained by removing the attached phrase from the user identifiers.

Figure 4:
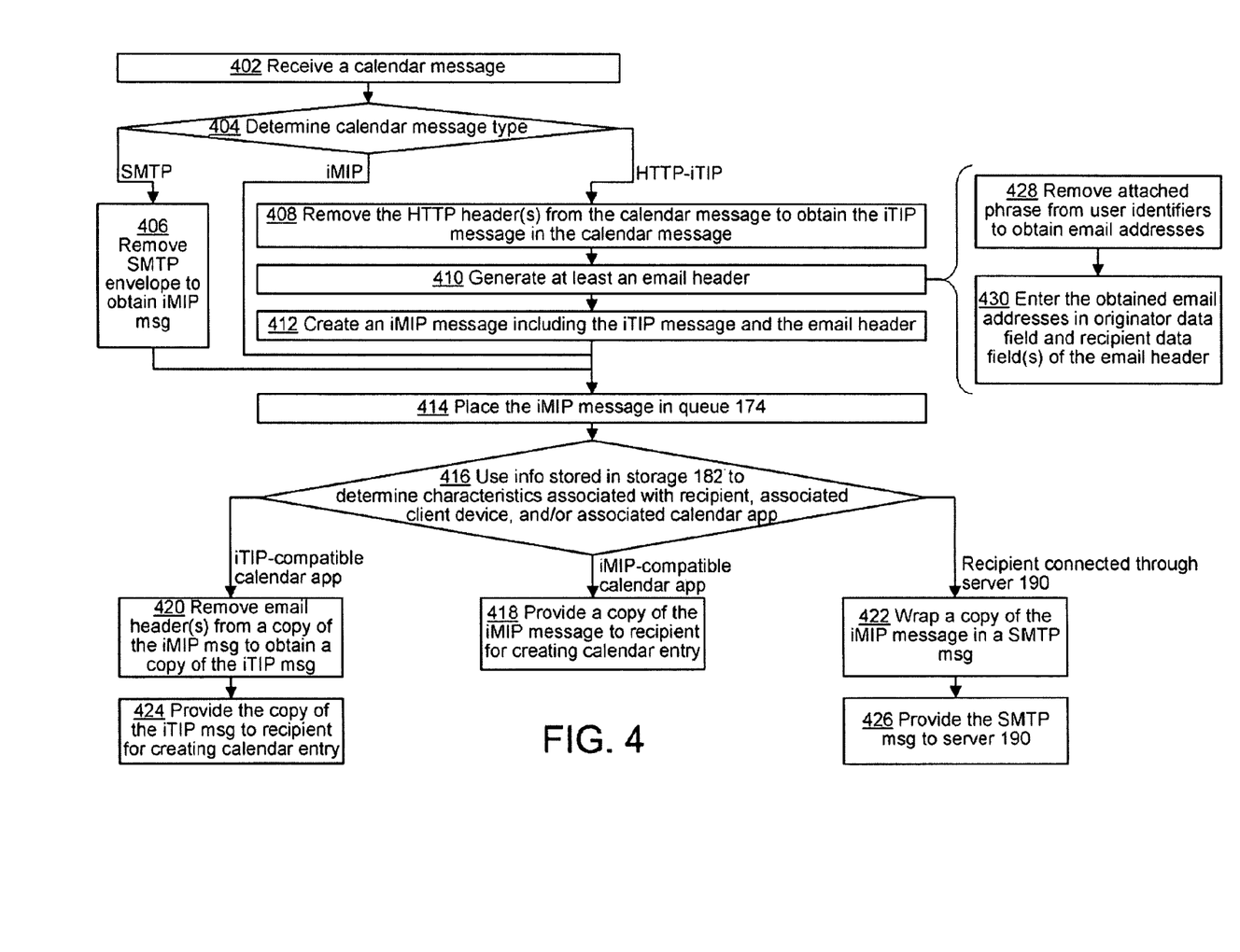
FIG. 4 shows a flowchart illustrating a method for facilitating creating one or more calendar entries in one or more client devices in accordance with one or more embodiments of the present invention.

FIG. 4 shows a flowchart illustrating a method for facilitating creating one or more calendar entries in one or more client devices in accordance with one or more embodiments of the present invention. The method may be implemented by, for example, utilizing server 170 illustrated in the example of FIG. 1. The method may start with step 402, in which server 170 may receive a calendar message.

In step 404, server 170 may determine the type of the received calendar message. If the calendar message is an iMIP message, such as a calendar message generated by iMIP-compatible calendar application 124 or calendar application 144 illustrated in the example of FIG. 1, control may be transferred to step 414. If the calendar message is a SMTP message, such as a calendar message received from server 190 illustrated in the example of FIG. 1, control may be transferred to step 406, in which server 170 may remove the SMTP envelope to obtain the iMIP message included in the SMTP message before proceeding to step 414. If the calendar message is a HTTP-iTIP message (e.g., HTTP request calendar message 300 illustrated in the example of FIG. 3A), control may be transferred to step 408.

In step 408, server 170 may remove the HTTP header(s) (e.g., HTTP header 302 illustrated in the example of FIG. 3A) from the calendar message to obtain the iTIP message (e.g., iTIP message 304 illustrated in the example of FIG. 3A) in the calendar message.

In step 410, server 170 (or conversion unit 172 therein) may generate one or more email envelopes (e.g., email envelopes 312 and 314 illustrated in the example of FIG. 3B). Step 410 may include two sub-steps: step 428 and step 430. In step 428, server 170 may remove the attached phrase (e.g., "mailto:") from the user identifiers (e.g., user identifiers 392, 394, and 396 illustrated in the example of FIG. 3B) in the iTIP message to efficiently obtain email addresses (e.g., email addresses 332, 342, and 344 illustrated in the example of FIG. 3B). In step 430, server 170 may enter the obtained email addresses in the originator data field (e.g., originator data fields 330 illustrated in the example of FIG. 3B) and the recipient data field(s) (e.g., recipient data field 340 illustrated in the example of FIG. 3B) in one or more email envelopes.

In step 412, server 170 (or conversion unit 172 therein) may create an iMIP message (e.g., iMIP message 310 illustrated in the example of FIG. 3B) including the iTIP message (e.g., iTIP message 304 illustrated in the example of FIG. 3B) and the email envelope(s).

In step 414, server 170 may place the iMIP message in queue 174 (illustrated in the example of FIG. 1) for subsequent processing and/or delivery of the iMIP message.

In step 416, server 170 may use information stored in storage 182 (illustrated in the example of FIG. 1) to efficiently determine characteristics associated with each recipient of the calendar message, the client device associated with the recipient, and/or the calendar application associated with the recipient. Server 170 may not need to rely on an external LDAP server for obtaining the information. Accordingly, embodiments of the invention may minimize dependence on an external LDAP server, thereby preventing delay potentially caused by such an external LDAP server. Advantageously, reliability and efficiency may be maximized.

If the recipient is determined to be associated with an iMIP-compatible calendar application (e.g., a WebDAV-compatible calendar application or an IMAP-compatible calendar application), control may be transferred to step 418. If the recipient is determined to be associated with an iTIP-compatible calendar application (e.g., a CalDAV-compatible calendar application), control may be transferred to step 420. If the recipient is determined to be connected to server 170 through server 190, control may be transferred to step 422.

In step 418, server 170 may provide a copy of the iMIP message to the client device associated with the recipient for enabling a calendar entry to be created in the client device.

In step 420, server 170 (or conversion unit 172 therein) may remove the email envelope(s) from a copy of the iMIP message to obtain a copy of the iTIP message.

In step 424, server 170 may provide the copy of the iTIP message to the client device associated with the recipient for enabling a calendar entry to be created in the client device.

In step 422, server 170 (or email server 178 therein) may wrap a copy of the iMIP message in a SMTP message (e.g., SMTP calendar message 320 illustrated in the example of FIG. 3B).

In step 426, server 170 may provide the SMTP message to server 190 for enabling a calendar entry to be created in the client device associated with the recipient. Examples of subsequent processes performed by server 190 are discussed with reference to the example of FIG. 5.

Figure 5:
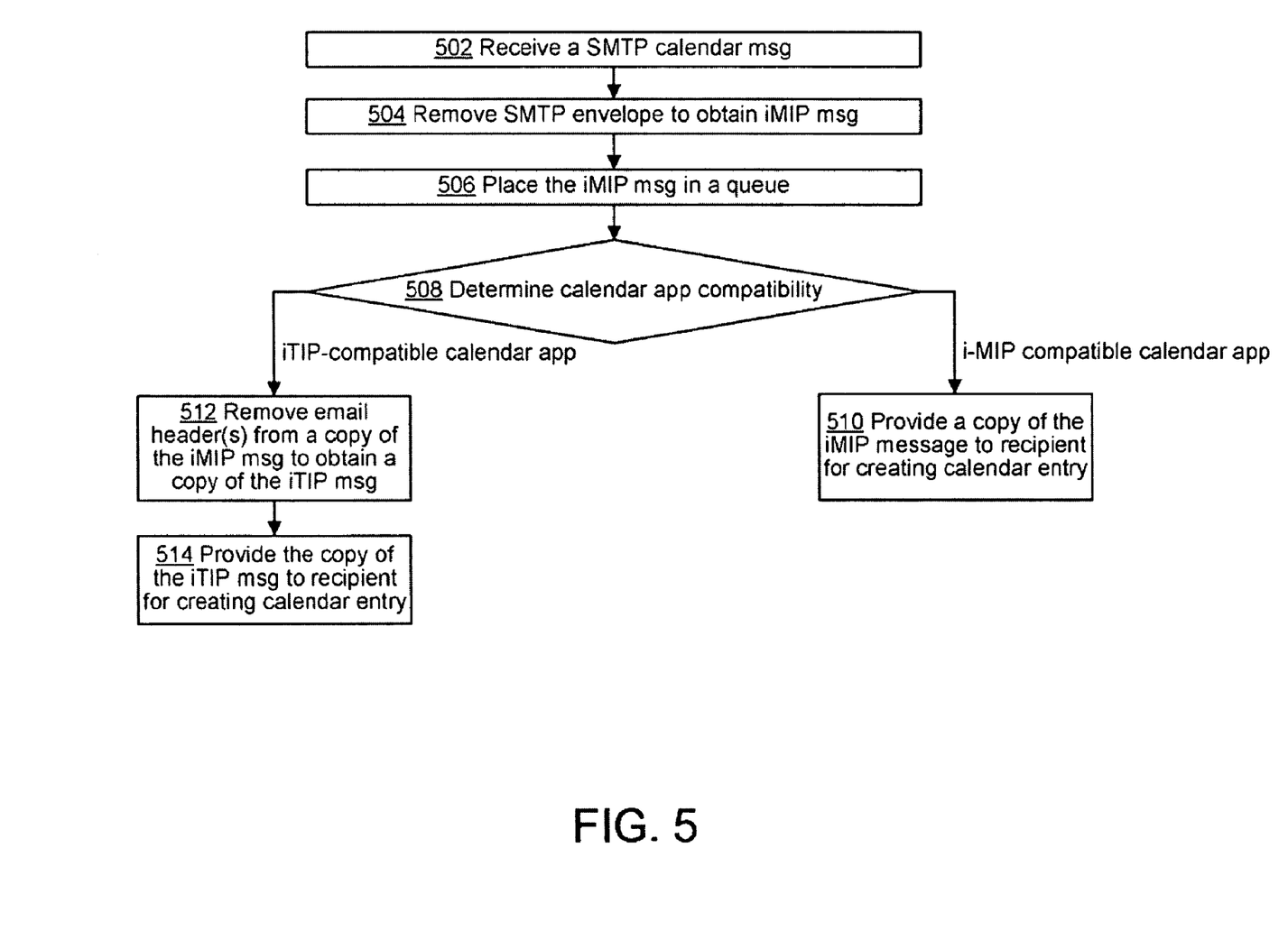
FIG. 5 shows a flowchart illustrating a method for facilitating creating one or more calendar entries in one or more client devices in accordance with one or more embodiments of the present invention.

FIG. 5 shows a flowchart illustrating a method for facilitating creating one or more calendar entries in one or more client devices in accordance with one or more embodiments of the present invention. The method may be implemented by, for example, utilizing server 190 illustrated in the example of FIG. 1. The method may start with step 502, in which server 190 may receive a SMTP calendar message, for example, from server 170.

In step 504, server 190 may remove the SMTP envelope (e.g., SMTP envelope 322 illustrated in the example of FIG. 3B) to obtain the included iMIP message (e.g., iMIP message 310 illustrated in the example of FIG. 3B).

In step 506, server 190 may place the iMIP message in a queue for subsequent processing and/or delivery of the iMIP message.

In step 508, server 190 may determine whether the calendar application associated with addressed recipient is compatible with iMIP or with iTIP. If the calendar application is compatible with iMIP (e.g., calendar application 164 illustrated in the example of FIG. 1), control may be transferred to step 510. If the calendar application is compatible with iTIP (e.g., calendar application 154 illustrated in the example of FIG. 1), control may be transferred to step 512. In one or more embodiments, server 190 may perform the determination based on information stored in server 190 without relying on an external LDAP server, thereby maximizing efficiency.

In step 510, server 190 may provide a copy of the iMIP message to the client device associated with the recipient for enabling a calendar entry to be created in the client device. For example, calendar application 164 may effectively create a calendar entry in client 162 according to the iMIP message.

In step 512, server 190 (or conversion unit 192 therein) may remove the email envelope(s) from a copy of the iMIP message to obtain a copy of the included iTIP message.

In step 514, server 190 may provide the copy of the iTIP message to the client device associated with the recipient for enabling a calendar entry to be created in the client device. For example, calendar application 154 may effectively create a calendar entry in client 152 according to the iTIP message.

As can be appreciated from the foregoing, embodiments of the invention may utilize email addresses to generate identifiers to be included in calendar messages. Accordingly, the identifiers may be readily resolvable (without requiring extensive parsing actions) to various calendar applications and various communication systems involved in processing calendar messages. Advantageously, embodiments of the invention may effectively resolve the problems of incompatibility between calendar applications and calendar messages.

Embodiments of the invention may also perform calendar message conversion or manipulation to facilitate creating calendar entries. Advantageously, various calendar applications (based on various calendar/communication protocols) may be ensured to receive compatible calendar messages to effectively create calendar entries. As a result, confusion and frustration between users using different calendar applications may be minimized.

Embodiments of the invention may store user, client device, and calendar application information in a storage unit of the communication server device responsible for transporting calendar messages. Accordingly, embodiments of the invention may minimize dependence on an external LDAP server, thereby preventing delay potentially caused by such an external LDAP server. Advantageously, embodiments of the invention may enable efficient and effective generation and delivery of calendar messages for timely creation of calendar entries.

While this invention has been described in terms of several embodiments, there are alterations, permutations, and equivalents, which fall within the scope of this invention. It should also be noted that there are many alternative ways of implementing the methods and apparatuses of the present invention. Furthermore, embodiments of the present invention may find utility in other applications. The abstract section is provided herein for convenience and, due to word count limitation, is accordingly written for reading convenience and should not be employed to limit the scope of the claims. It is therefore intended that the following appended claims be interpreted as including all such alterations, permutations, and equivalents as fall within the true spirit and scope of the present invention.

What is claimed is:

1. A method for facilitating creating one or more calendar entries in one or more client devices, the method comprising:

receiving, using a first communication server device, an iTIP (iCalendar Transport-Independent interoperability Protocol) message from a first client device, the first client device being associated with a first user, the first client device having a first calendar application, the iTIP message being addressed to at least a second user, the second user being associated with a second client device, the second client device having a second calendar application;

generating, using the first communication server device, an iMIP (iCalendar Message-Based Interoperability Protocol) message using the iTIP message;

providing at least one of a copy of the iTIP message and a copy of the iMIP message to a least one of the second client device and a second communication server device connected to the second client device for enabling the second calendar application to generate a calendar entry in the second client device, wherein the first communication server device transmits the copy of the iTIP message to deliver information in the iTIP message received from the first client device to a first destination client device and wherein the first communication server device transmits a copy of the iMIP message to deliver the information in the iTIP message received from the first client device to a second destination client device, whether the copy of the iTIP message or the iMIP message is transmitted by the first communication server device is determined by the first communication server device;

generating a first-user identifier for the first user using an email address of the first user; and generating the first-user identifier further using an attached phrase, the first-user identifier including at least the email address of the first user and the attached phrase; and providing the first-user identifier to the first client device for the first client device to include the first-user identifier in the iTIP message.

2. The method of claim 1 further comprising:

using information stored in the first communication server device to determine one or more characteristics associated with at least one of the second user, the second client device, and the second calendar application; and after determining that the second client device is connected to the first communication server device through a second communication server device, wrapping the copy of the iMIP message in a SMTP (Simple Mail Transfer Protocol) message and providing the SMTP message to the second communication server device for enabling the second calendar application to create the calendar entry based on content of at least one of the copy of the iTIP message and the copy of the iMIP message, the wrapping being performed using the first communication server device.

3. The method of claim 2 further comprising:
using the second communication server device to obtain the copy of the iTIP message by removing an SMTP envelope and removing at least one email envelope from the SMTP message; and
providing the copy of iTIP message from the second communication server device to the second client device.

4. The method of claim 1 further comprising:
using information stored in the first communication server device to determine one or more characteristics associated with at least one of the second user, the second client device, and the second calendar application; and
after determining that the second calendar application is compatible with iTIP, removing at least an email envelope from the copy of the iMIP message to obtain a copy of the iTIP message and providing the copy of the iTIP message to the second client device for enabling the second calendar application to create the calendar entry based on content of the copy of the iTIP message, the removing being performed using the first communication server device.

5. The method of claim 1 further comprising:
using information stored in the first communication server device to determine one or more characteristics associated with at least one of the second user, the second client device, and the second calendar application; and
after determining that the second calendar application is compatible with iMIP, providing the copy of the iMIP message to the second client device for enabling the second calendar application to create the calendar entry based on content of the copy of the iMIP message, the providing being performed using the first communication server device.

6. The method of claim 1 further comprising:
receiving a synchronization request from the first client device; and
providing a synchronization response to the first client device, the synchronization response including the first-user identifier.

7. The method of claim 1 wherein the attached phrase is "mailto:", the attached phrase preceding the email address of the first user in the first-user identifier.

8. The method of claim 1 further comprising:
generating at least an email envelope for the iMIP message;
including at least an originator data field in the email envelope;
removing a copy of the attached phrase from a copy of the first-user identifier to obtain a copy of the email address of the first user;
including the copy of the email address of the first user in the originator data field of the iMIP message; and
including the email envelope and the iTIP message in the iMIP message.

9. The method of claim 1 further comprising:
generating a second-user identifier for the second user using an email address of the second user;
generating the second-user identifier further using the attached phrase, the second-user identifier including at least the email address of the second user and the attached phrase; and providing the second-user identifier to the first client device for the first client device to include the second-user identifier in the iTIP message.

10. The method of claim 9 further comprising:
generating at least an email envelope for the iMIP message;
including at least an recipient data field in the email envelope;
removing a copy of the attached phrase from a copy of the second-user identifier to obtain a copy of the email address of the second user;
including the copy of the email address of the second user in the recipient data field of the iMIP message; and
including the email envelope and the iTIP message in the iMIP message.

11. The method of claim 1 further comprising:
identifying a calendar protocol that is compatible with the first calendar application to generate first-client calendar protocol information when the first client device registers with the first communication server device; and
storing the first-client calendar protocol information in the first communication server device.

12. The method of claim 1 further comprising:
receiving, using the first communication server device, a calendar message from the first client device; and
removing a HTTP (Hypertext Transfer Protocol) header from the calendar message to obtain the iTIP message.

13. The method of claim 1 further comprising:
transmitting a confirmation message to the first client device after performing the generating and before performing the providing; and
placing the iMIP message into a queue in the first communication server device after the generating and before the providing.

14. A communication server device comprising a non-transitory program storage medium having computer readable code stored therein, the computer readable code being configured for facilitating creating one or more calendar entries in one or more client devices, the communication server device comprising:
code, stored in the non-transitory program storage medium in the communication server device, for receiving an iTIP (iCalendar Transport-Independent Interoperability Protocol) message from a first client device, the first client device being associated with a first user, the first client device having a first calendar application, the iTIP message being addressed to at least a second user, the second user being associated with a second client device, the second client device having a second calendar application;
code for generating an iMIP (iCalendar Message-Based Interoperability Protocol) message using the iTIP message;
code for providing at least one of a copy of the iTIP message and a copy of the iMIP message to the second client device for enabling the second calendar application to generate a calendar entry in the second client device, wherein the first communication server device transmits the copy of the iTIP message to deliver information in the iTIP message received from the first client device to a first destination client device and wherein the first communication server device transmits a copy of the iMIP message to deliver the information in the iTIP message received from the first client device to a second destination client device, whether the copy of the iTIP message or the copy of the iMIP message is transmitted by the first communication server device is determined by the first communication server device;

code for generating a first-user identifier for the first user using an email address of the first user;

code for generating the first-user identifier further using an attached phrase, the first-user identifier including at least the email address of the first user and the attached phrase; and code providing the first-user identifier to the first client device for the first client device to include the first-user identifier in the iTIP message.

15. The communication server device of claim 14 further comprising a storage unit for storing information pertaining to one or more characteristics associated with at least one of the second user, the second client device, and the second calendar application, the information including at least one of an email address of the second user and calendar protocol information pertaining to a calendar protocol that is compatible with the second calendar application.

16. The communication server device of claim 14 further comprising:

code for generating at least an email envelope for the iMIP message;

code for including at least an originator data field in the email envelope;

code for removing a copy of the attached phrase from a copy of the first-user identifier to obtain a copy of the email address of the first user;

code for including the copy of the email address of the first user in the originator data field of the iMIP message; and code for including the email envelope and the iTIP message in the iMIP message.

17. The communication server device of claim 14 further comprising:

code for removing at least one email envelope from a copy of a second iMIP message to obtain a copy of a second iTIP message; and code for providing the copy of the second iTIP message to a third client device that has a third calendar application for enabling the third calendar application to update the third client device.

* * * * *